April 1, 1941.  B. STARKE  2,236,653
CONTROL TRANSMISSION MECHANISM
Filed Feb. 9, 1939
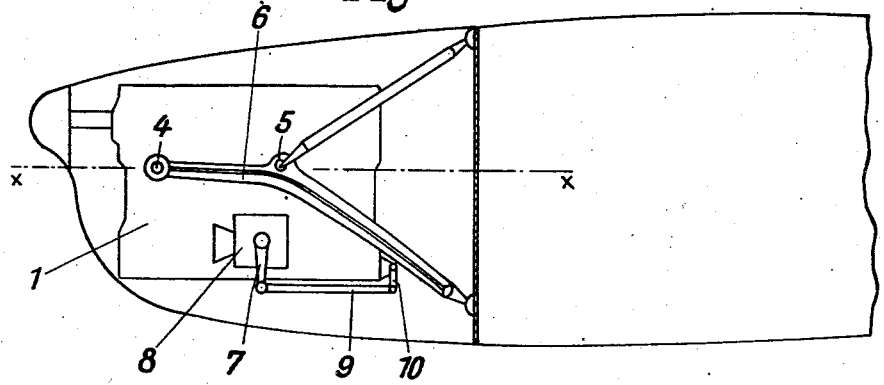
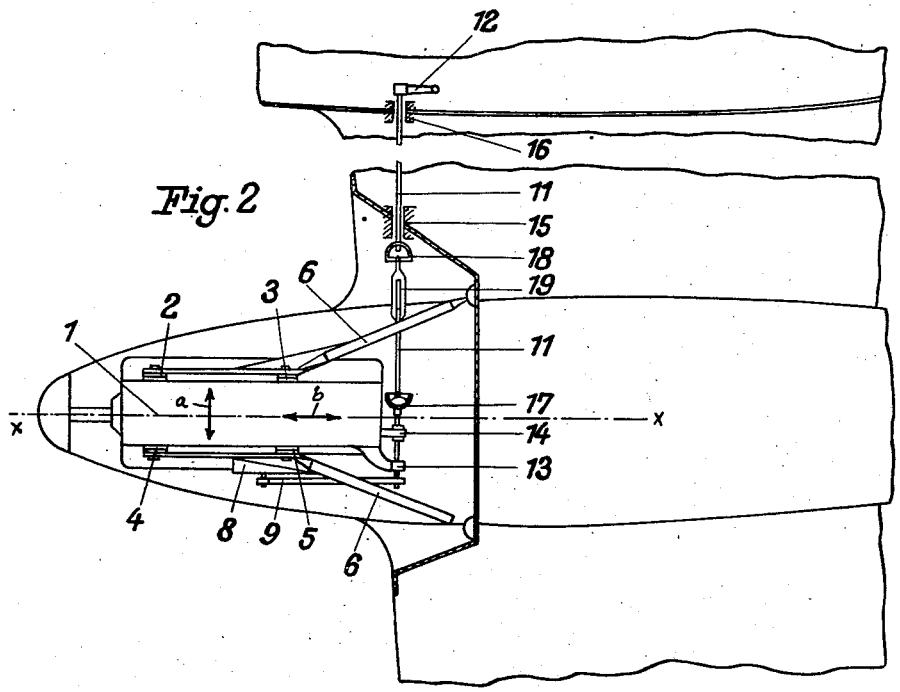
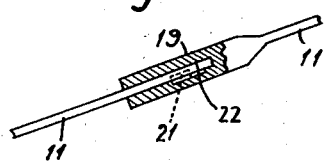
Inventor:
BRUNO STÄRKE
By: Richards & Geier
Attorneys Patented Apr. 1, 1941

2,236,653

UNITED STATES PATENT OFFICE 2,236,653

CONTROL TRANSMISSION MECHANISM

Bruno Stärke, Dessau, Germany, assignor to Junkers Fluggeug-und-Motorenwerke A. G., Dessau, Germany, a corporation of Germany Application February 9, 1939, Serial No. 255,545
In Germany March 29, 1938

1 Claim. (Cl. 74—504)

The present invention relates to control transmission mechanisms and particularly relates to control transmission mechanisms associated with aircraft.

Although the present invention will be particularly described in connection with its application to aircraft, it will be understood it also has application to other control transmission mechanisms where a control movement is to be transmitted from a control board or from a control stand adjacent the position of the driver, operator or pilot to a mechanism to be controlled, such as for example, an aircraft engine which is supported in such a manner as to move or vibrate relatively to the control panel or control stand from which the control transmission mechanism are operated.

In aircraft, the engine or engines are usually elastically supported in such a manner that they are subject to vibration or other movement or changes of position throughout operation thereof.

At the same time, most of the controls of the engine, as well as other operating elements in and about the aircraft are controlled from the control stand or control panel adjacent the position of the operator, pilot or driver, as the case may be.

During operation of the engine or aircraft, the vibrational movement of the engine upon its resilient or elastic supports will cause relative movement in respect to the control stands or control panel and it is among the primary objects of the present invention to provide improved control transmission mechanisms which will avoid and prevent any movement of the control transmission mechanisms as might tend to cause an undesired control or adjustment of the regulating, shifting, steering or other control members of the aircraft or its engine.

In the usual type of aircraft construction, the transmission members usually include or consist of an arrangement of linkages or connected rods extending between the control handle at the control stands and the control member to be adjusted at the engine.

For example, by way of illustration, the throttle control lever situated near the driver's seat may be connected through a series of rods or linkages to the throttle valve located at the carburetor of the engine of the craft and in such an arrangement, the movements or vibrations of the engine, particularly when mounted upon rubber supports may become so great as to cause unintentional displacement of the linkages and an undesirable change in position of the throttle.

It has been suggested that these difficulties may be avoided by wire or cable connections passing through flexible tubes between the control stands and the engine. However, with such wire or cable connections, there is considerable idle movement, substantial friction and tendency of the cables or wires to stretch which render use of such wire or cable connections undesirable in connection with aircraft, particularly in connection with the fuel supply controls.

It is therefore, among the further objects of the present invention to provide an improved control transmission mechanism for aircraft and particularly desired to be connected with the fuel supply controls which will enable an accurate adjustment without substantial idle movement, great friction or tendency of stretching or contraction of the transmission mechanism and which will give reliable and accurate adjustment in both directions.

Other objects will be obvious or will be apparent during the course of the following specification.

In accomplishing the above objects, it has been found most satisfactory, according to one embodiment of the present invention to transmit the control movement of the control elements of the engine by a rotational movement of the transmission mechanism and, at the same time, permit bending or angular movements and also expansion or longitudinal movements of the transmission mechanism without affecting the control adjustment of the elements on the engine to be adjusted.

Although the control transmission mechanism or transmission shaft may be constructed in different manners, it has been found most suitable to provide therein universal joints to permit of lateral or bending movements and expansion clutches to permit contraction or elongation of the rod elements of the shaft.

All relative movement between the engine and the control stand is then taken up by this combination of universal joints and expansion devices while the rotational movement of the transmission shaft may be converted into a linear reciprocating movement of the control element to be adjusted at the engine by suitable crank, cam, thread and nut or rack and pinion devices.

The above and other objects will appear more clearly from the following detailed description when taken in connection with the accompanying drawing, which illustrates a preferred embodiment of the inventive idea.

In the drawing:

Figure 1 is a side view diagrammatically showing an airplane engine with a control rod for adjusting the throttle.

Figure 2 is a plan view of the device of Figure 1.

Figure 3 is a detailed view showing the connection permitting expansion and contraction of an arm in the control arrangement to compensate for movements of the airplane engine upon its support.

Referring to Figures 1 and 2, the airplane engine is resiliently or elastically mounted or suspended in the frame 6 at the positions 2, 3, 4 and 5.

The lever 7 controls the throttle in the carburetor 8. The lever 7 is pivotally connected to the guide rod 9, which guide rod 9 is in turn connected to the end of the lever 10.

The lever 10 is connected to one end of the control shaft 11, which shaft extends to the control stand of the airplane engine.

The engine 1 will tend to vibrate around a longitudinal axis extending substantially between the elastic or rubber supports 2, 3, 4 and 5, and it has been found most desirable to position the control shaft 11 so that it will extend transversely to the longitudinal axis of the engine upon such vibrational movement.

It will be noted that the adjustment member or lever 12 is connected to the other end of the shaft 11 from that connected to the lever 10.

The adjustment shaft 11 is supported at the engine in the bearings 13 and 14 and it is also supported at the bearings in the perforated parts of the wall of the air craft body as indicated at 15 and 16.

The universal joints 17 and 18 and the expansion clutch or sliding connection 19 are positioned intermediately of the shaft 11, as indicated preferably between the bearings 13, 14, 15 and 16.

In operation, a swinging movement of the lever or arm 12 will cause rotational movement of the shaft 11 and swinging movement of the levers 7 and 10 with longitudinal movement of the rod 9. The swinging movement of the lever 7 may be converted into a linear movement by a rack and pinion, a cam, a screw and thread, or some other suitable means.

At the same time, vibrational movement of the engine will not cause this rotational movement of the shaft 11 and all bending movement in the shaft 11 will be taken up by the universal joints 17 and 18 while extension or contraction of the shaft 11 will be taken up by the clutch 19. Thus the universal joints 17 and 18 take up the lateral movements, while the expansion clutch 19 takes up the movements which may be transverse to the main vibration axis of the engine.

In any case, there will be no undesirable adjustment of the control or movement of the lever 7 due to normal vibration of the engine body 1 and it is thus apparent that the applicant has provided a simple construction to accomplish the objects of the present invention.

In Figures 1 and 2 is indicated the axis $x-x$ upon which a swinging movement of the engine 1 may take place upon the elastic supports 2, 3, 4 and 5.

Referring to Figure 2, it will be noted there may be vibration back and forth along the arrow, and there may also be a longitudinal movement backwardly and forwardly along the arrow.

In either case, the movement is taken up in the transmission by the joint 19 with corresponding movements of the universal joints 17 and 18.

As is shown in detail in Figure 3, at the joint 19, adjacent split end portions of the rod 11, form a telescoping connection, one having an enlarged cup like receiver into which the end of the other member projects.

Inside of the receiver there is provided a groove 22 in which slides the key fitted into the end of the rod 11. The connection of the key 21 and the grooves 22 permit separation and movement together of the ends 11, to accommodate the engine movements $a$, $b$.

With the movement of the key 21 in the slot 22 there will be no turning movement of the transmission and, therefore, no inadvertent regulation of the mechanism which will remain in the position as set by the controller applied to the element 12.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

In an aircraft of the type having a control stand and an engine, said engine being elastically mounted and partaking of vibrational movement upon its longitudinal axis during operation and also being provided with a carburetor having a throttle; a control transmission mechanism including, in combination, a shaft extending transversely of the longitudinal axis, bearings for the ends of said shaft, the bearing at one end being rigid with the engine and at the other being rigid with control stand, and at least one sliding connection and joints between said bearing permitting bending movements and changes in the length of said shaft without transmitting control movements, said joints including at least one universal joint.

BRUNO STÄRKE.